US006429801B1

(12) United States Patent
Pergande

(10) Patent No.: US 6,429,801 B1
(45) Date of Patent: Aug. 6, 2002

(54) METHOD AND APPARATUS FOR PRECURSOR BASED RADAR

(75) Inventor: Al Pergande, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/691,177

(22) Filed: Oct. 19, 2000

(51) Int. Cl.⁷ .............................................. G01S 13/00
(52) U.S. Cl. ........................ 342/21; 375/256; 342/27; 342/118; 342/134; 342/175; 342/176; 342/181; 342/195
(58) Field of Search ............................. 342/21, 22, 27, 342/28, 134–144, 175, 192–197, 202–204, 118, 176–186; 375/256

(56) References Cited

U.S. PATENT DOCUMENTS

| | | |
|---|---|---|
| 4,408,156 A | 10/1983 | Veys |
| 5,053,772 A | 10/1991 | Lamper et al. |
| 5,140,332 A * | 8/1992 | Martin et al. ............ 342/202 |
| 5,241,314 A | 8/1993 | Keeler et al. |
| 5,248,976 A | 9/1993 | Niho |
| 5,262,781 A | 11/1993 | Evans |
| 5,315,561 A | 5/1994 | Grossi |
| 5,357,253 A | 10/1994 | Van Etten et al. |
| 5,502,444 A | 3/1996 | Kohlberg |
| 5,546,084 A | 8/1996 | Hindman |
| 5,598,152 A | 1/1997 | Scarzello et al. |
| 5,892,479 A | 4/1999 | Mills et al. |

OTHER PUBLICATIONS

Kurt Edmund Oughstun, "Pulse Propagation in a Linear, Casually Dispersive Medium", Proceedings of the IEEE; vol. 79, No. 10; Oct. 1991; pp. 1379–1390.*

David L. Black, "An Overview of Impulse Radar Phenomenon", IEEE AQES Systems Magazine; Dec. 1992; pp. 6–11.*

M. Sakai et al., "Femtosecond Optical Precursors in Exciton Resonant Region", Optical Society of America paper TuC4–1/149; published in the year 2000.*

"Electromagnetic Pulse Propagation in Causal Dielectrics", K.E. Oughstun and G.C. Sherman, Springer–Verlag, 1994, Table of Contents; pp. 1–13; 378–383; 392–393.

(List continued on next page.)

Primary Examiner—Bernarr E. Gregory
(74) Attorney, Agent, or Firm—Burns, Doane, Swecker & Mathis, LLP

(57) ABSTRACT

A method and apparatus is described for signal processing to identify an object in an environment. A precursor associated with an electromagnetic wave interacting with the object is received and a property of the object identified using precursor characteristics. The electromagnetic wave is transmitted with a characteristic including a pulse having a sharp rise time so as to generate the precursor. The pulse is generated using a circuit including capacitive discharge and a semiconductor device such as a Drift Step Recovery Diode. Alternatively the pulse may be generated using a microwave diode switch and a broadband semiconductor amplifier or a traveling wave tube amplifier. The characteristic may also includes a signal with a phase reversal generated by dividing the electromagnetic signal and phase modulating the first electromagnetic signal with the divided signal to generate the phase reversal so as to generate the precursor. A receiver may further establish channels corresponding to the possible precursor spectra and associate each channel with a corresponding possible material property associated with the object including water generated precursor spectra, radar absorptive material generated precursor spectra, and metallic oxides generated precursor spectra. A color display may include an image of the object with possible material properties displayed in a corresponding color in proportion to respective values associated with received precursor spectra.

20 Claims, 16 Drawing Sheets

OTHER PUBLICATIONS

"Power Nanosecond Semiconductor Opening Plasma Switches", V.I. Brylevsky, V.M. Efanov, et al. Ioffe Phisical–Technical Institute of Russian Academy of Science, St. Petersburg, Russia (4 pages), No Date.

"New Superfast Power Closing Switched–Dynistors on Delayed Ionization", V.M. Efanov, and A.F. Kardo–Sysoev, et al, Ioffe Phisical–Technical Institute of Russian Academy of Science, St. Petersburg, Russia (6 pages), No Date.

"Fast Power Switches From Picosecond to Nanosecond Time Scale and Their Application to Pulsed Power", A.F. Kardo–Sysoev, V.M. Efanov, et al, Ioffe Phisical–Technical Institute of Russian Academy of Science, St. Petersburg, Russia (6 pages), No Date.

"Time–domain Theory of Forerunners", Anders Karlson et al, 1998 Optical Society of America, vo. 15, No. 2/Feb. 1998, pp. 487–502.

1. A. Sommerfeld; Annalen Der Physik; Vierte Folge. Band 44; Über die Fortpflanzung des Lichtes in dispergierenden Medien; pp. 177–203; Leipzig, Germany, 1914.

2. L. Brillouin; Über die Fortpflanzung des Lichtes in dispergierenden Medien; pp. 203–241; Annalen Der Physik; Band 44, Heft2; Leipzig, Germany, 1914.

* cited by examiner

METHOD AND APPARATUS FOR PRECURSOR BASED RADAR

BACKGROUND

The present invention relates to radar. More particularly, the present invention relates to a method and apparatus for identifying materials based on propagation characteristics of electromagnetic energy other than through air or free space.

The propagation characteristics of electromagnetic energy which includes radio frequency energy, commonly used in modern communication and radar systems, in various materials gives rise to behavior which is generally governed by Maxwell's equations. In order to solve Maxwell's equations in a relatively straightforward manner, a number of simplifying assumptions are usually made. These simplifying assumptions may typically include assuming that a transmission media or portion of a transmission path is characterized as a non-dispersive, isotropic, homogeneous dielectric. Further simplifying assumptions may include seeking a steady state solution with little consideration paid to transient phenomena associated with, for example, the interaction of electromagnetic waves with their surroundings. In most radar applications, simply receiving and processing a signal return to gain meaningful information with regard to a contact of interest or target in the face of potentially disruptive phenomenon such as scatter or clutter is the primary aim of the system.

Problems arise however, when more information is desired about a radar contact of interest or when the radar contact of interest is obscured behind radar absorptive or dispersive media. Prior art radar systems are generally responsive to target cross section of the first object encountered and, with certain exceptions such as, for example, imaging radar or interrogating radar, cannot provide additional information regarding the contact. Such prior art radar systems further are incapable of generating a useable return from absorptive or dispersive materials, as energy associated with a transmitted radar signal is either absorbed or scattered by such materials to the extent that the energy return is negligible.

While using the simplifying assumptions generally associated with the use of Maxwell's equations to predict the propagation behavior of electromagnetic signals is more than adequate for most radar applications, additional transient phenomenon may be observed when the simplifying assumptions are discarded in favor of more detailed analysis. The signals associated with these transient events are known generally as 'precursors', and were first described by Leon Brillouin and G Sommerfeld in 1914. At the time, they were not regarded as being significant, Brillouin thinking of them as 'vanishingly small'. The original development of knowledge in the area of precursors was related to research associated with the theory of relativity, and in proving or disproving Einstein's hypothesis that nothing could travel faster than the speed of light in a vacuum. Despite their discovery, precursors have not been used in prior art radar systems.

Several prior art systems do exist, for example, for expanding the capabilities of conventional radar, and for the identification of certain objects, with some of these systems using frequencies generally regarded as below conventional radar frequencies. U.S. Pat. No. 4,408,156 to Veys, for example, describes a method and an apparatus for identifying sheet articles of non-conductive material which are marked for identification purposes. The method and apparatus of Veys includes producing an identification signal for a sheet article of non-conductive material by incorporating a small quantity of thin conductive fibers capable absorbing and reflecting microwave radiation energy. Veys, however, does not disclose the use of precursors.

U.S. Pat. No. 5,241,314 to Keeler et al. describes an image lidar transmitter downlink for guidance of an underwater vehicle. Keeler, at best, allows for maintaining communications for control of underwater vehicles however does not disclose the use of precursors.

U.S. Pat. No. 5,315,561 to Grossi describes a system for transmitting an electromagnetic signal under water. The system of Grossi uses a low-frequency signal to overcome the absorptive properties of salt water and receives a scattered reflected signal from anomalies below the surface of the water. The system of Grossi in using low-frequency signals gains the advantage of deeper penetration in terms of skin depths as compared to a transmitter using higher frequency signals. However, it should be noted that Grossi fails to make use of precursors.

U.S. Pat. No. 5,053,772 to Lamper et al. describes a radar system using a method for motion and range closure compensation. The system of Lamper however fails to disclose making use of precursors and further fails to disclose the ability to penetrate a lossy media.

Another system is described in U.S. Pat. No. 5,357,253 to Van Etten et al. in which low-frequency signals are used to provide deep subsurface penetration. It should be noted that the system of Van Etten departs little from the related art of seismic radiation to detect and map subsurface layers and buried objects. It should further be noted that the system of Van Etten further fails to disclose a use of precursors. Similarly, other systems exist for providing various enhanced capabilities for various purposes such as penetrating salt water, removing surface clutter, image processing, and the like, however, none disclose the use of precursors which allow for the penetration of lossy media.

One prior art system, based on U.S. Pat. No. 5,502,442 to Kohlberg, describes a method and apparatus for improving the signal to clutter ratio of an airborne earth penetrating radar. Kohlberg describes relying on a comparison between the dispersive and non-dispersive response of signals returned from a subsurface object to eliminate dispersive signals or clutter. However, Kohlberg does not disclose the use of precursors.

Finding actual solutions to behavioral models associated with practical applications involving precursors is quite difficult. Such solutions, however, were discovered by Dr. Kurt Oughstun and G Sherman in the mid 1970's, and may be further described in the text entitled "Electromagnetic Pulse Propagation in Causal Dielectrics", K. E. Oughstun and G. C. Sherman, Springer-Verlag, 1994, see, for example, Chapter 1 and Chapter 9. However, as noted, it is apparent that no prior art systems exist which make use of the precursor phenomenon.

While precursors exist and may be exploitable the difficulty posed by, for example, solving the characteristic equations associated with the transient precursor phenomena remains unaddressed.

It would be appreciated in the art therefore for a method and apparatus for allowing a radar to see farther into dispersive materials, and return signals with much lower attenuation therefrom. Such a system could provide a detectable radar signal return.

It would further be appreciated in the art for a method and apparatus which would provide, for example, the ability to make practical use of the precursor phenomena by identifying the presence of objects obscured by dispersive material.

It would still further be appreciated in the art for a method and apparatus which would provide, for example, the ability to make practical use of the precursor phenomena by identifying materials associated with unobscured objects or by identifying materials associated with objects obscured by dispersive material.

SUMMARY

To make use of the precursor phenomena, a method and apparatus for providing a precursor based radar is described.

Thus, in accordance with one exemplary embodiment, signal processing may be performed to identify an object in an environment, including receiving a precursor associated with an electromagnetic wave interacting with the object. Various properties associated with the object may be identified using one or more characteristics associated with the received precursor. Accordingly, the electromagnetic wave may be transmitted with a characteristic such as, for example, a sharp rise time, so as to generate the precursor when the electromagnetic wave interacts with the object. Such a characteristic may be generated using a circuit which includes the use of capacitive discharge and a semiconductor device such as a Drift Step Recovery Diode.

In an alternative exemplary embodiment in accordance with the present invention, an electromagnetic wave having the desired characteristics may be generated using a microwave diode switch where the signal may then be amplified through, for example, a broadband semiconductor amplifier or a traveling wave tube amplifier.

In still another alternative exemplary embodiment in accordance with the present invention the characteristic of the electromagnetic wave may include at least one phase reversal which may be achieved by dividing the electromagnetic wave and producing a divided signal and then phase modulating the original electromagnetic wave with the divided signal to generate the phase reversal. Phase reversals, like sharp rise time pulses, ARE be capable of generating precursors when such an electromagnetic wave having phase reversals interacts with the object.

In still another exemplary embodiment in accordance with the present invention, one or more channels may be established corresponding to one or more possible characteristics associated with the precursor such as, for example, precursor spectra. Each of the one or more channels may be associated with a corresponding one of one or more possible material properties associated with the object. The corresponding precursor spectra associated with the possible material properties may include, for example, water generated precursor spectra, radar absorptive material generated precursor spectra, and metallic oxides RUST generated precursor spectra.

In still another alternative exemplary embodiment in accordance with the present invention, a color display may present an image of the object with the material properties associated with the object indicated by displaying each of the material properties with a corresponding color. Colors associated with the material properties of the object may be displayed in proportion to respective values associated with one or more received precursor spectra.

BRIEF DESCRIPTION OF THE DRAWINGS

The objects and advantages of the invention will be understood by reading the following detailed description in conjunction with the drawings, in which.

DETAILED DESCRIPTION

Figure 1:
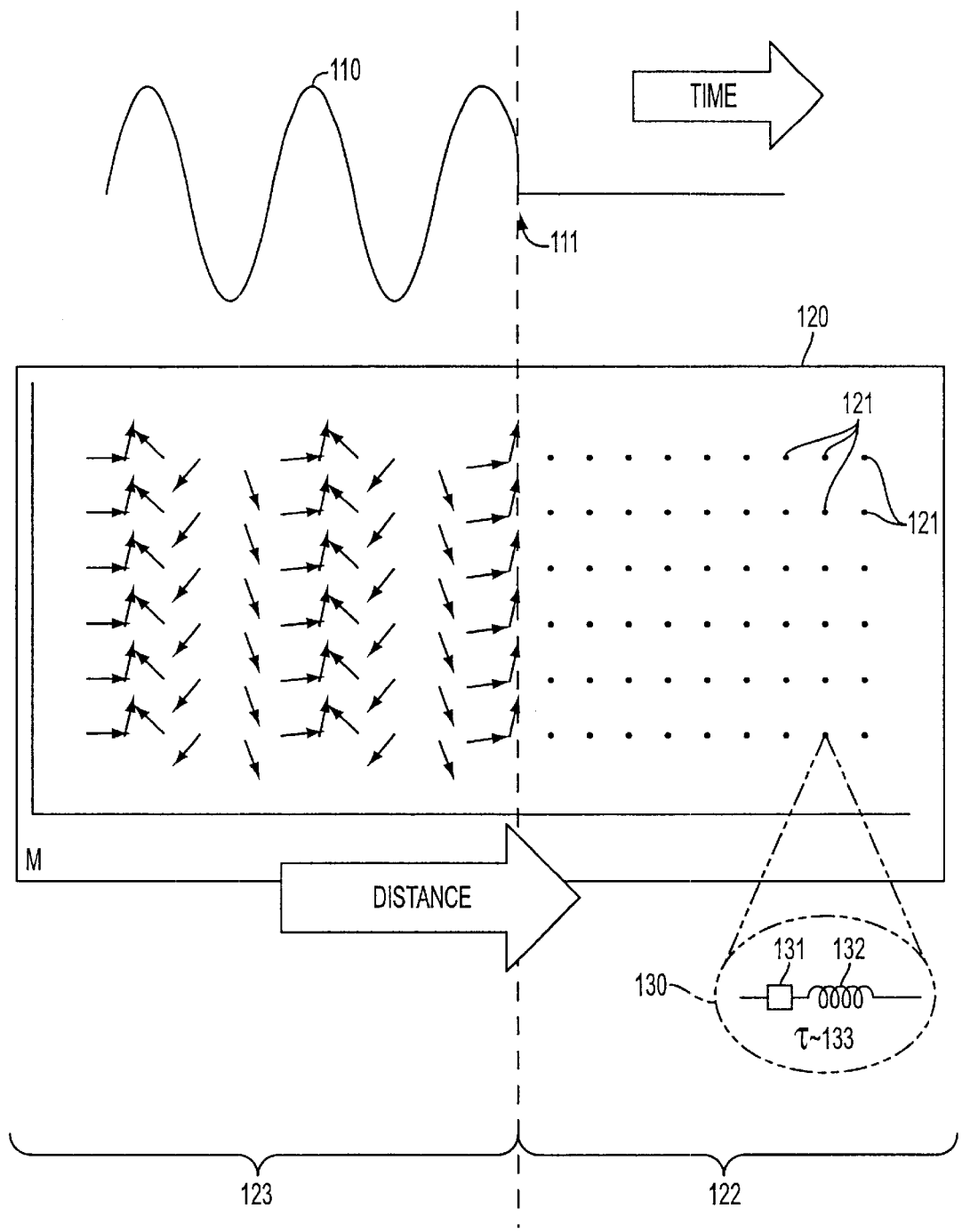
FIG. 1 is a diagram illustrating an exemplary electromagnetic wave interacting with a media.

The various features of the invention will now be described with reference to the figures, in which like parts are identified with the same reference characters.

Thus a method and apparatus are described for providing a precursor based radar. In accordance with the present invention, various propagation, reflection and attenuation characteristics of precursors when interacting with an object, allow material properties of the object to be identified even when obscured by absorptive media.

When electromagnetic wave 110 is applied to media 120 characterized as a dielectric such as is illustrated in FIG. 1, individual polarizable atoms or molecules 121 may become excited. Each atom or molecule 121 be regarded as small mass 131 spring 132 damper system 130, with an associated time constant 133. Prior to the arrival of electromagnetic wave 110, for example in region 122, atoms or molecules 121 are subject only to thermal agitation. After electromagnetic wave 110 is established, for example in region 123, energy continuously couples between electromagnetic wave 110 and atom or molecules 121, creating a perturbation or excitation of atoms or molecules 121 in synchronization with the frequency of electromagnetic wave 110. The synchronous movement of atoms or molecules 121 creates individual fields which oppose the energy field from electromagnetic wave 110 and create a phase delay which slows electromagnetic wave 110 propagation by the refractive index of the material. Thus the interaction between electromagnetic wave 110 in the time period near wave edge 111 and atoms or molecules 121 of media 120, creates the precursor phenomena, which may last on the order of time constant 133 associated with mass-spring damper system 130.

Figure 2A:
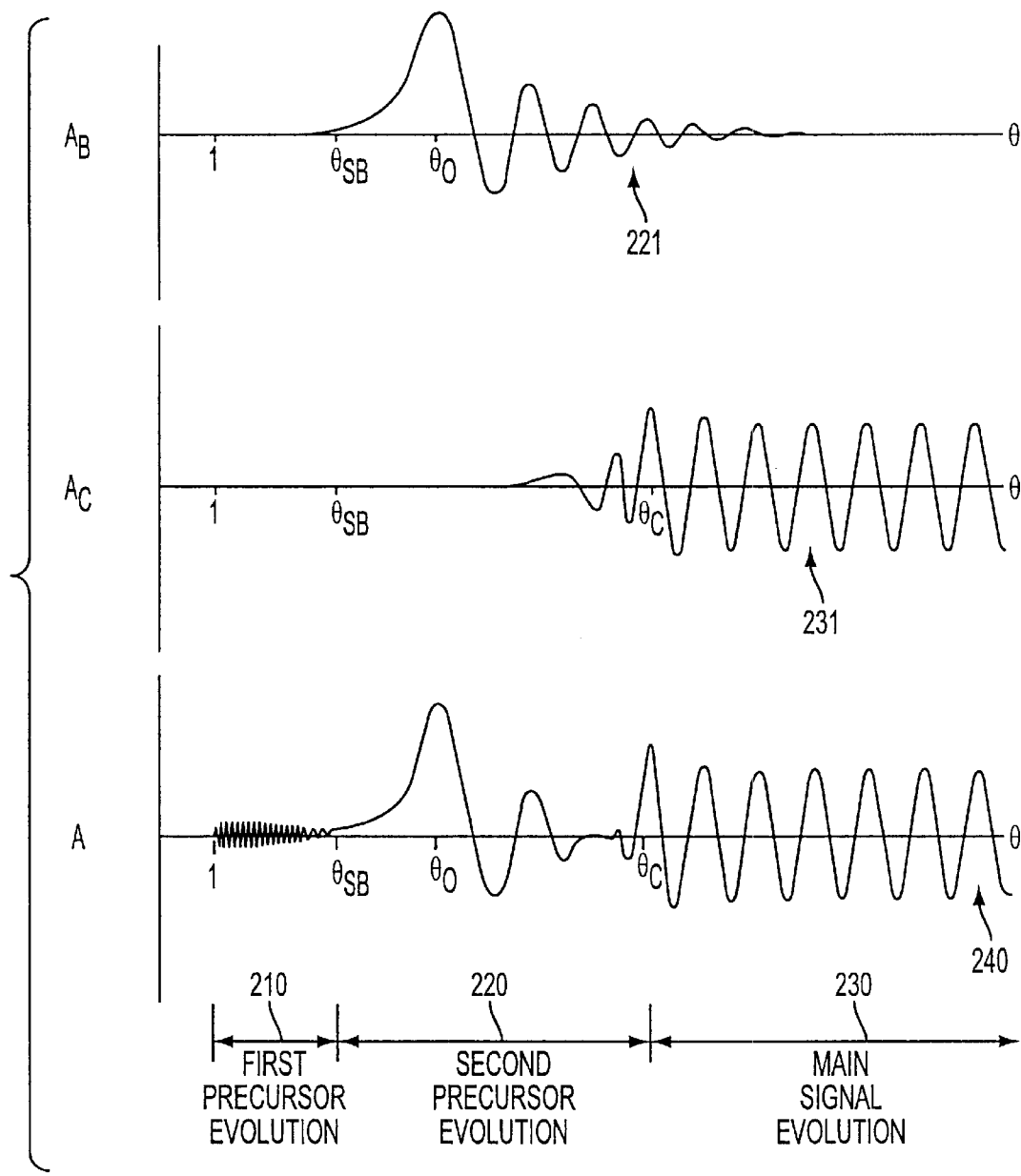
FIG. 2A is a graph illustrating exemplary precursor waveforms.
Figure 2B:
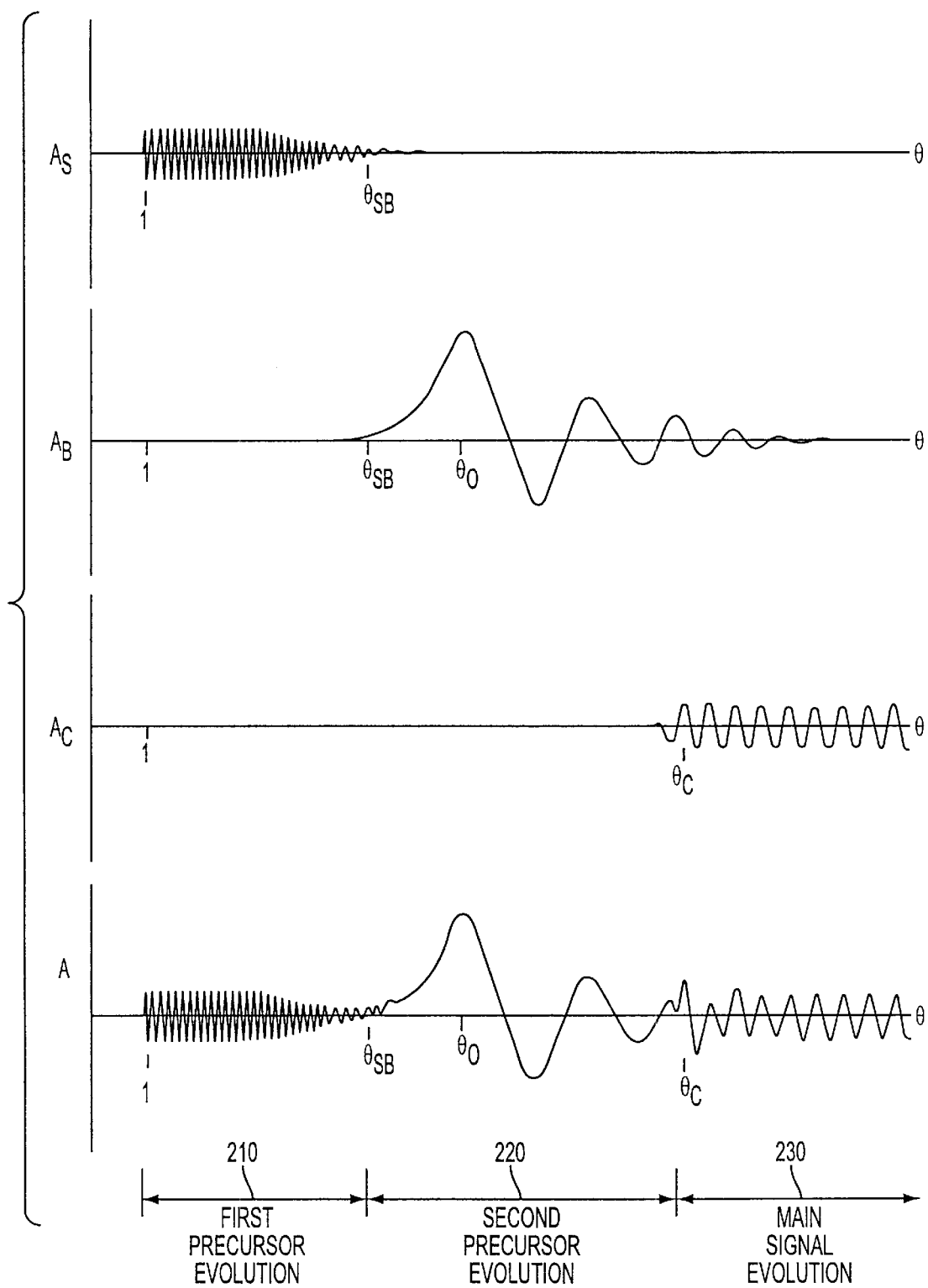
FIG. 2B is a graph illustrating exemplary precursor waveforms associated with reflections from a radar absorptive medium.
Figure 2C:
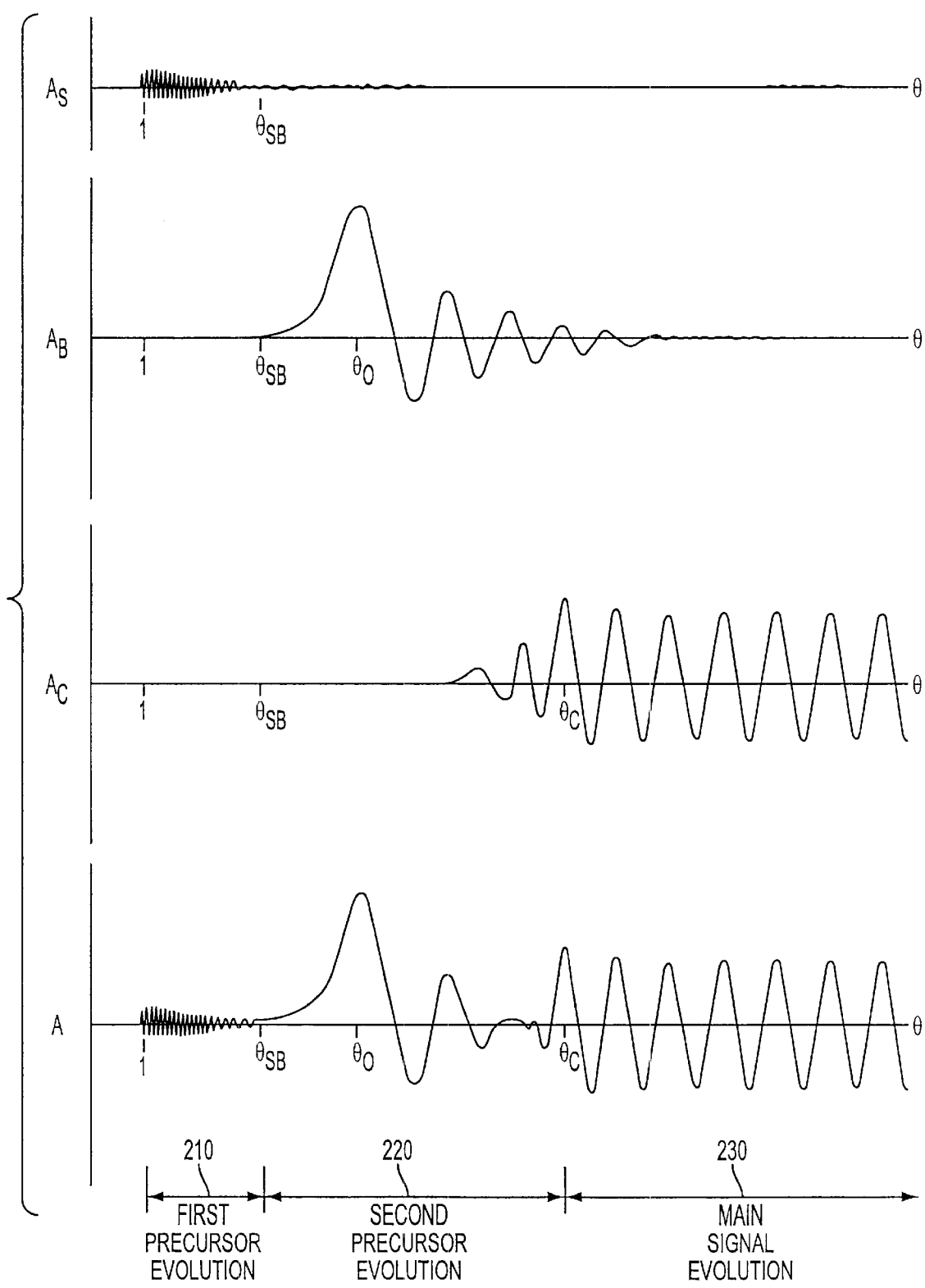
FIG. 2C is a graph further illustrating exemplary precursor waveforms associated with reflections from a radar absorptive medium.
Figure 2D:
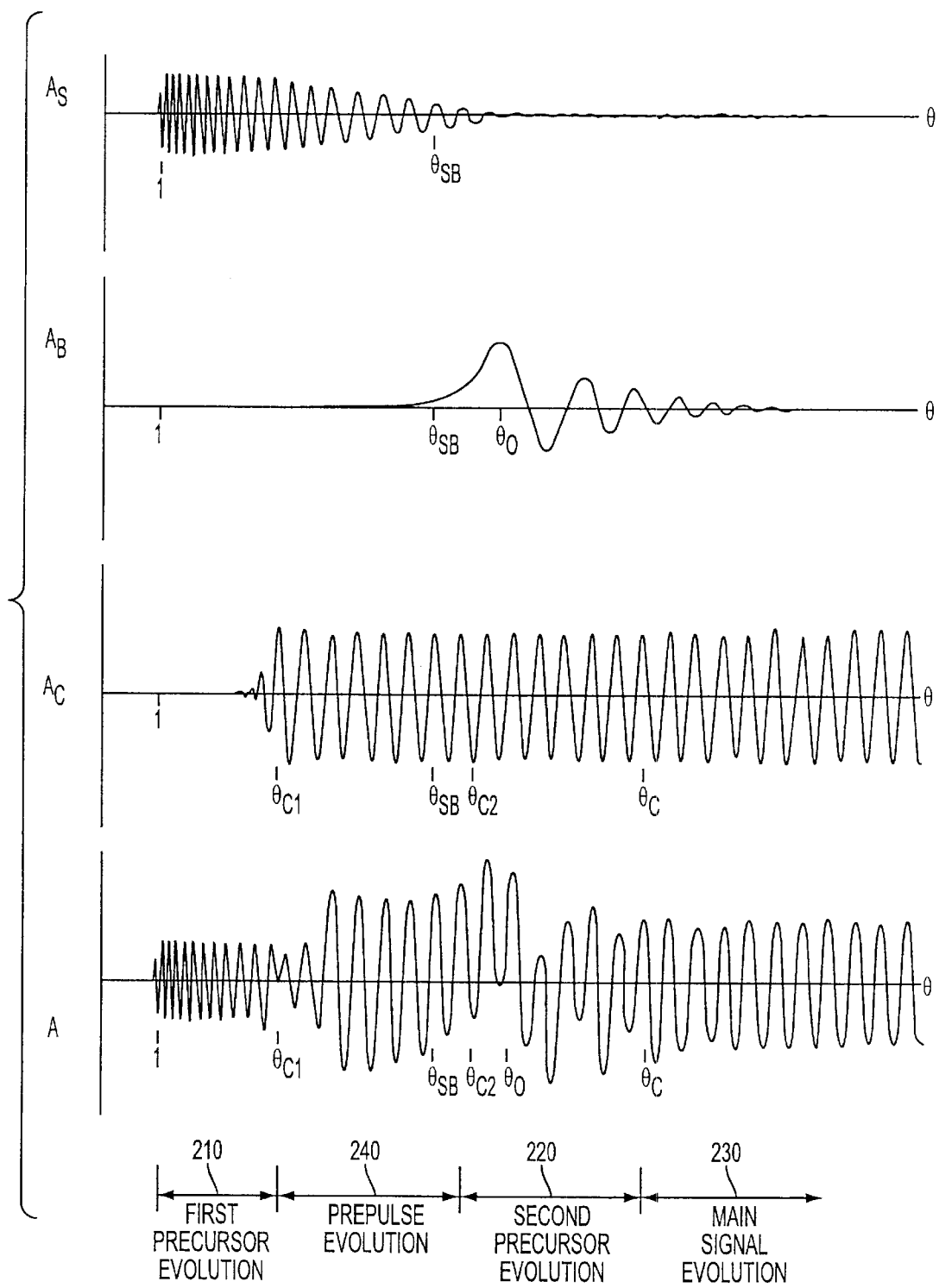
FIG. 2D is a graph still further illustrating exemplary precursor waveforms associated with a reflections from a radar absorptive material.

It is generally known that two distinct precursor fields exist. As is shown in FIG. 2A, composite signal 240 is shown containing a main signal (shown individually at 231), the Brillouin precursor (shown individually at 221) and Sommerfeld precursor 210. As can be seen with reference to composite signal 240, Sommerfeld precursor 210 begins at an infinite frequency and drops to near the resonant frequency associated with media 120. The leading edge of the Sommerfeld Precursor 210 travels with relatively little energy at the speed of light in vacuum through the material. Brillouin precursor 220 has a complex frequency and resembles a Gaussian-like pulse traveling at the leading edge of main carrier signal 230. It is further known that Brillouin precursor 220 has more energy than Sommerfeld Precursor 210. Graphs illustrating exemplary precursor waveforms associated with reflections from a radar absorptive material are illustrated in FIGS. 2B, 2C, and 2D. It should be noted that the exact characteristic of the returned precursor may be influenced by, for example, the frequency of the incident electromagnetic wave, the material from which the wave is reflected, and so on, as previously described. FIG. 2D, for example illustrates exemplary precursor waveforms as may be generated, for example, from water.

Figure 3A:
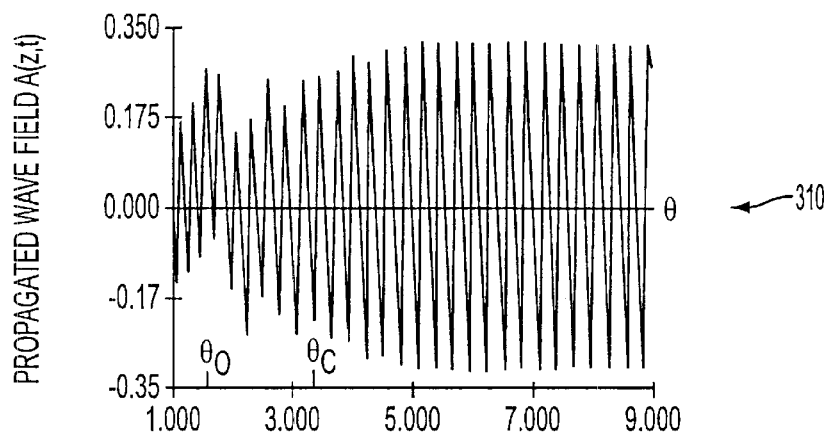
FIG. 3 is a graph further illustrating exemplary precursor waveforms as a function of propagation distance.
Figure 3B:
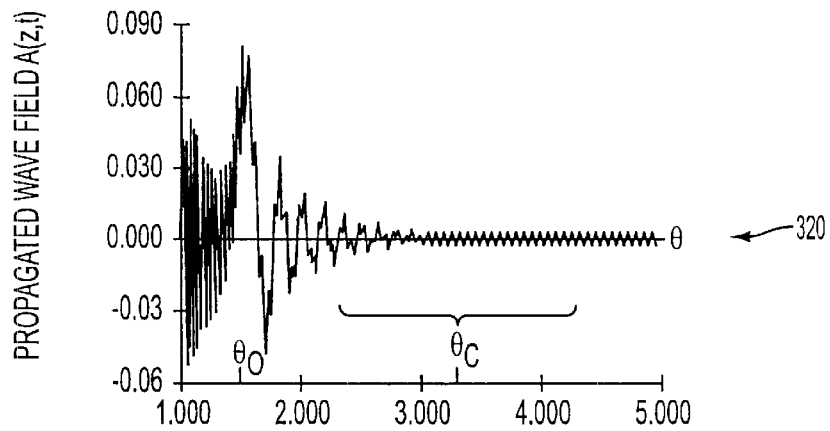
Figure 3C:
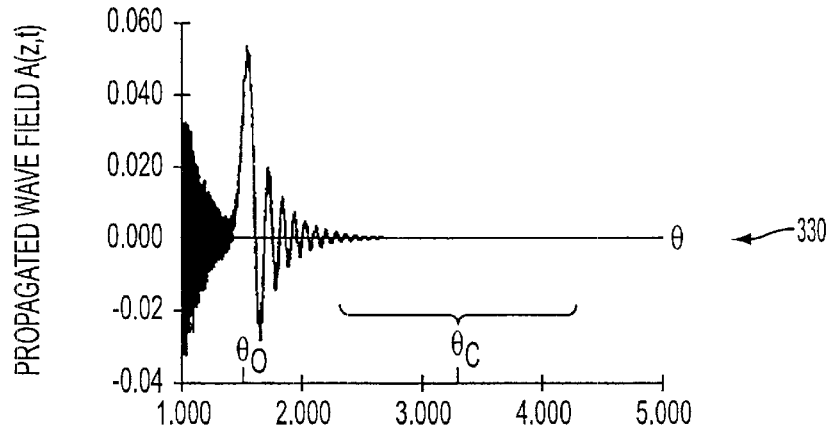

In FIG. 3, graphs 310, 320, and 330 illustrate precursor characteristics associated with, for example, absorptive materials of different "skin depth". Standard radar signals may be absorbed exponentially in lossy media, with carrier power dropping at an exponential rate with respect to distance. The attenuation generally results from a damping action of the material characterized as mass spring damper system 130 at the molecular level as illustrated in and described with reference to FIG. 1. Since precursors do not couple strongly to the molecular resonance that causes losses associated with the principal carrier signal, precursors propagate with far lower loss-on the order of I/SQRT (distance). Thus, a precursor field can penetrate deeply into lossy media such a damp soil, foliage, or radar absorbing material.

Figure 4A:
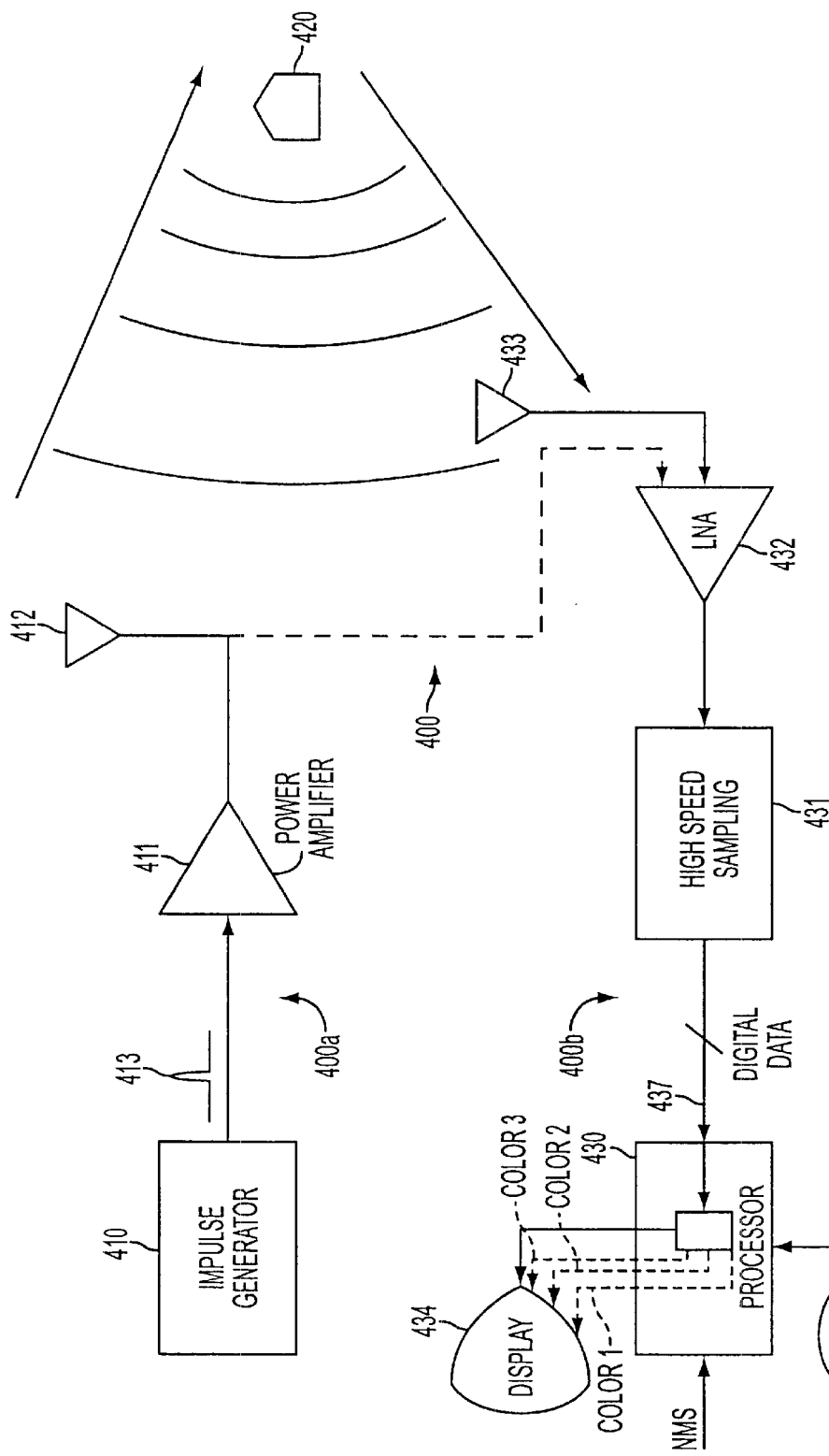
FIG. 4A is a block diagram illustrating an exemplary precursor-based radar system in accordance with an exemplary embodiment of the present invention.

Thus, in accordance with various embodiments of the present invention, a method and apparatus is described for providing a radar system which transmits signals for generating precursors, receives the precursors, and presents the resulting information to a display. A block diagram of an exemplary system in accordance with the present invention is illustrated in FIG. 4A. Exemplary radar system 400 may preferably include, for example, transmitter section 400a configured to generate signals capable of generating precursors and receiver section 400b configured to receive the signals and precursors, wherein the sections are embodied jointly in the same platform. It should be noted however, that signals capable of generating precursors may be separately generated by, for example, transmitter section 400a, and precursors may be separately received by receiver section 400b in accordance with the present invention wherein the sections, for example, are embodied in separate platforms. It should be noted that by generating signals capable of generating precursors as hereinafter described, and by processing information associated with received precursor signals, information related to, for example, the material properties of object 420 in a radar field may be provided even if object 420 is obscured by absorptive media.

As previously described with reference to FIG. 1, a precursor may be generated when there is a change in the amplitude or character of an electromagnetic field, such as for example the field associated with electromagnetic wave 110, interacting with media 120, or like lossy or absorptive media which may be characterized generally as a dielectric. However, to generate a precursor of detectable magnitude, a high power signal with a sharp rise time is needed. Several methods exist to generate such a pulse.

Figure 4B:
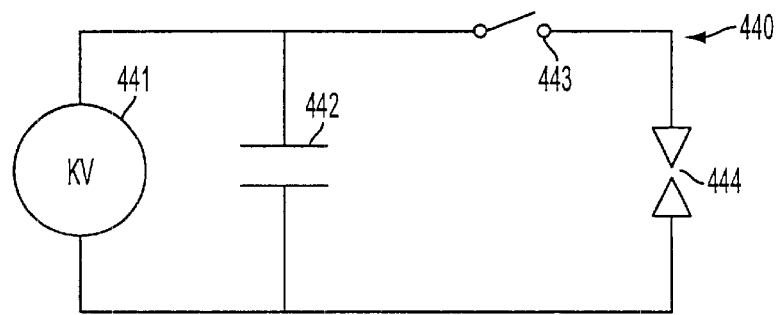
FIG. 4B is a simplified schematic diagram illustrating an exemplary impulse generating device in accordance with an exemplary embodiment of the present invention.

In one embodiment in accordance with the present invention, impulse generator 410 may be used for generating a magnetic pulse capable of generating precursors in objects. It will be appreciated to those skilled in the art that several methods may be used in impulse generator 410 to generate impulse signal 413 having the desired characteristics, e.g. sharp rise time, high power, and the like. One such method associated with one exemplary embodiment as illustrated in FIG. 4B may include the use of spark gap generator 440. In such an embodiment, capacitor 442 may be charged to a high voltage using voltage source 441, then suddenly discharged across spark gap 444, for example, by closing switch 443, creating an impulse of many kilovolts. An electromagnetic signal associated with such a pulse has very broad spectral characteristics, and no clearly defined carrier frequency. Spark gap generator 440 may be followed by a semiconductor device, which further sharpens the signal rise time, such as a Drift Step Recovery Diode as will be described in greater detail hereinafter with regard to FIG. 7A and FIG. 7B.

Figure 4C:
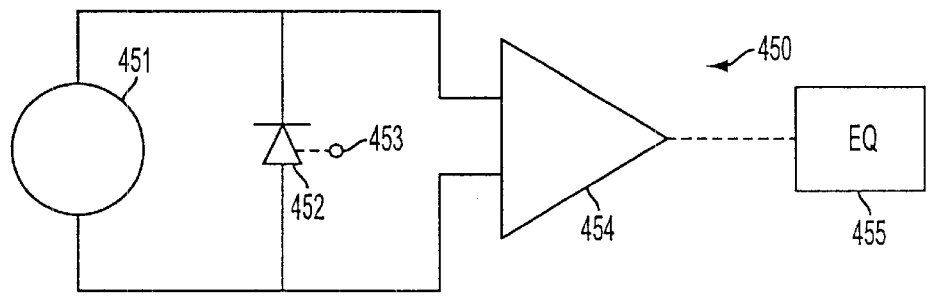
FIG. 4C is a simplified schematic diagram illustrating an exemplary impulse generating device in accordance with another exemplary embodiment of the present invention.

In yet another embodiment, as illustrated in FIG. 4C, microwave diode switch generator 450 may be used to create a sharp rise time pulse. A voltage signal from, for example, source 451 may be applied to microwave diode switch 452 and switched by applying a switching control signal thereto at 453. The resulting impulse signal may be amplified through amplifier 454 which may preferably be, for example, a broadband semiconductor amplifier or traveling wave tube amplifier. Generating an impulse using microwave diode switch generator 450 may be better compatible with existing radar systems, and thus has the advantage that any existing radar functions are easily retained. It should be noted that certain characteristics of amplifier 454 and related transmission lines associated with the use of microwave diode switch generator 450 and amplifier 454 in the present embodiment or similarly configured embodiments may be important, as, for example, bandwidth and dispersion characteristics may cause their own precursors to be generated. In general, the bandwidth of an amplifier is proportional to the rise time of the pulse that it will pass therefore broadband devices are preferable with the possibility of additional requirements for equalization, and the like such as, for example, at equalizer 455.

Figure 4D:
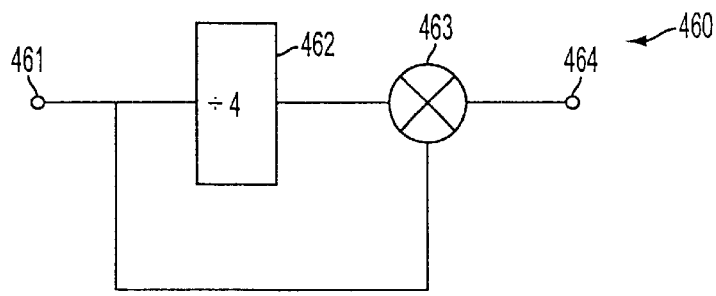
FIG. 4D is a simplified schematic diagram illustrating an exemplary impulse generating device in accordance with yet another exemplary embodiment of the present invention.

In yet another exemplary embodiment in accordance with the present invention as illustrated in FIG. 4D, another method for generating a suitable signal in impulse generator 410 is to phase modulate a fixed carrier signal. For example, a signal such as, for example, a 16 GHz carrier signal may be applied to high-speed counter 462 at input 461, counter 462 configured, for example, to divide by 4. The divided output of counter 462 may be used to modulate the original carrier signal with broadband mixer 463. The resulting output signal at output 464 may contain a 180-degree phase reversal every 4 cycles sufficient to excite precursor fields. Accordingly, a larger amount of energy may be induced into precursor fields reflected, for example, from object 420. In addition, DC loading on, for example, power amplifier 411 associated with such an embodiment may remain constant throughout the period where the precursor exciting phase reversals or "pulses" are generated. It will further be appreciated that the present embodiment could easily be switched on and off, or otherwise gated or controlled, allowing greater waveform flexibility.

With reference again to FIG. 4A, and in accordance with various embodiments of the present invention, conventional broadband antenna system 412 may be used to emit signals capable of generating precursor fields when interacting with objects as previously described. Broadband antenna system 412 may further be preferably embodied in, for example, a folded horn antenna as will be described in greater detail hereinafter. Precursors generated and returned from, for example, object 420, as well as conventional radar returns may further be received using broadband antenna system 412 or separate antenna system 433 as shown. Precursors and, in some instances normal signal reflections may be reflected from object 420 and received at receive antenna 433. After initial amplification at Low Noise Amplifier (LNA) 432, signals including precursors may be sampled at high speed sampler 431 where digital representations of incoming signals may be generated and output on bus 437 to processor 430. It should be noted that processor 430 may be configured to perform signal processing in accordance with the present invention to process precursor signals, and, for example, identify materials associated with object 420. Since one aim of the present invention is to provide information to a user, information related to precursor returns may be displayed on display device 434, which may be, for example, a CRT display, plasma display, heads up display, flat panel display, or the like display as would be known in the art. Information related to precursors may also be stored in storage device 435, which may be, for example, a disk drive—optical or magnetic, a floppy drive, a primary memory such as a RAM or the like. Moreover, as it will be appreciated, information related to precursors may be communicated to other radar systems through communication link 436.

The performance of receiver section 400b is of some concern, and thus, the spectral characteristic of the precursor may be used to facilitate processor 430 in handling precursors. It should be noted that while signal frequency has some impact on precursor generation, the spectral characteristic of the precursor is largely independent of the signal that creates it. It should further be noted that materials with different dispersion curves will return distinct precursor spectra. With reference again to FIG. 2D, precursor spectra are shown as, for example, signal portions corresponding to the first precursor evolution at 210, and the second precursor evolution at 220.

Thus in one embodiment in accordance with the present invention, processor 430 may be configured with a number of different receiver channels, with one channel configured as a conventional radar channel having, for example, a filter matched to the pulse width of, for example, impulse signal 413. Additional channels, such as, for example, 3 separate channels matched to different precursor spectra for water generated precursors, radar absorptive material generated precursors, and precursors generated by metallic oxides would be preferable. A composite of the signals from these 4 channels would be presented to display 434 where, for example, an operator could view each channel as a separate color, with the conventional radar return providing, for example, a conventional black and white display image. Information from other material channels may be added as different colors, thus indicating which materials are present in a given radar return image. A signal from a metallic oxide, for example, would be displayed as COLOR 1 and would indicate, for example, a vehicle, oil drum, metallic mine or the like. A signal from a water-bearing object, for example, would be displayed as COLOR 2 and would indicate, for example, a person, a tree, a pond or the like. Signals from Radar absorptive objects, for example, may not produce any return on a conventional radar channel, but would provide a signal return on a precursor channel and would be displayed, for example, with COLOR 3. As will be described in greater detail hereinafter, such a system has clear advantages associated with target selection for military operations.

Figure 5:
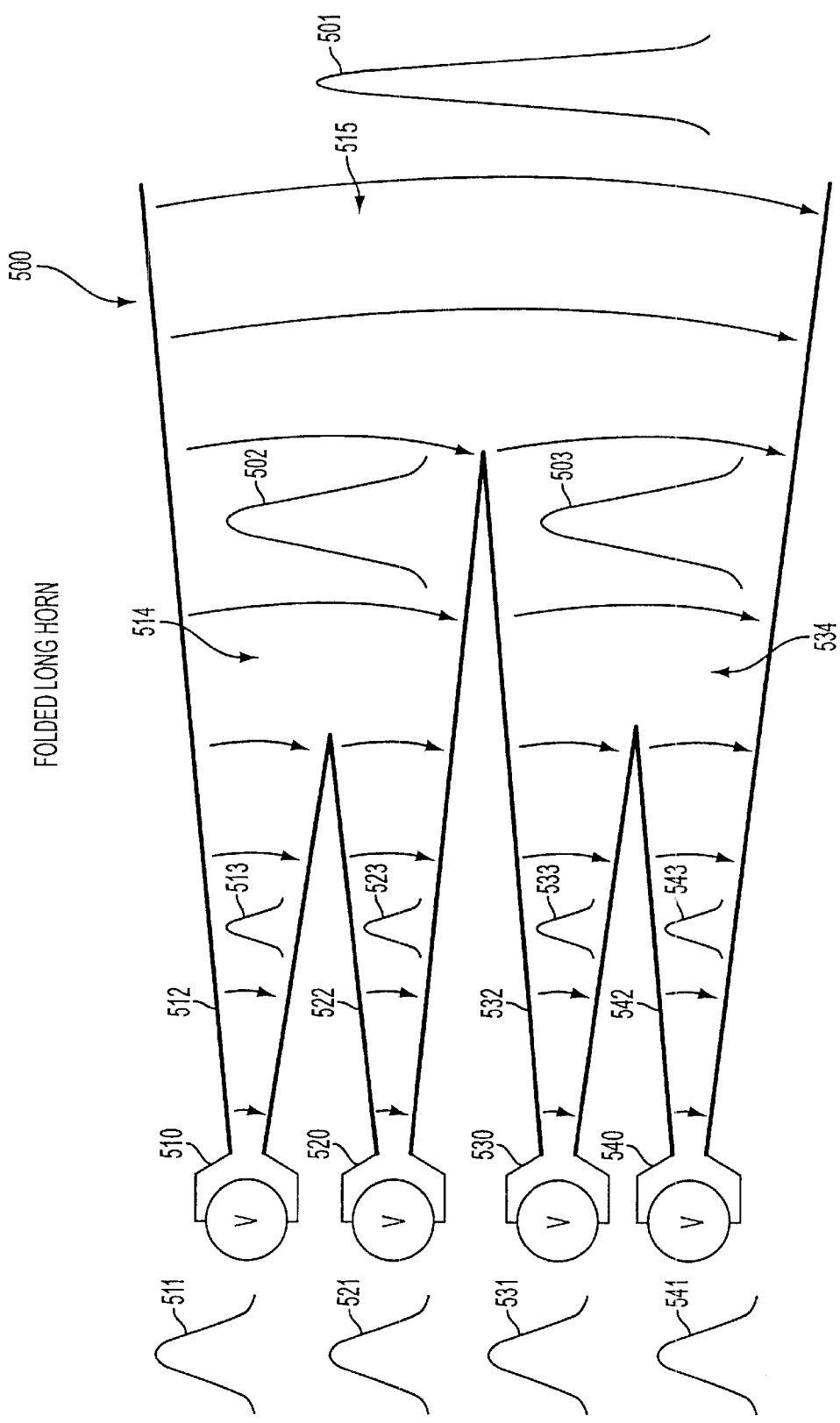
FIG. 5 is a diagram of an exemplary antenna for transmitting electromagnetic signals in accordance with an exemplary embodiment of the present invention.
Figure 6:
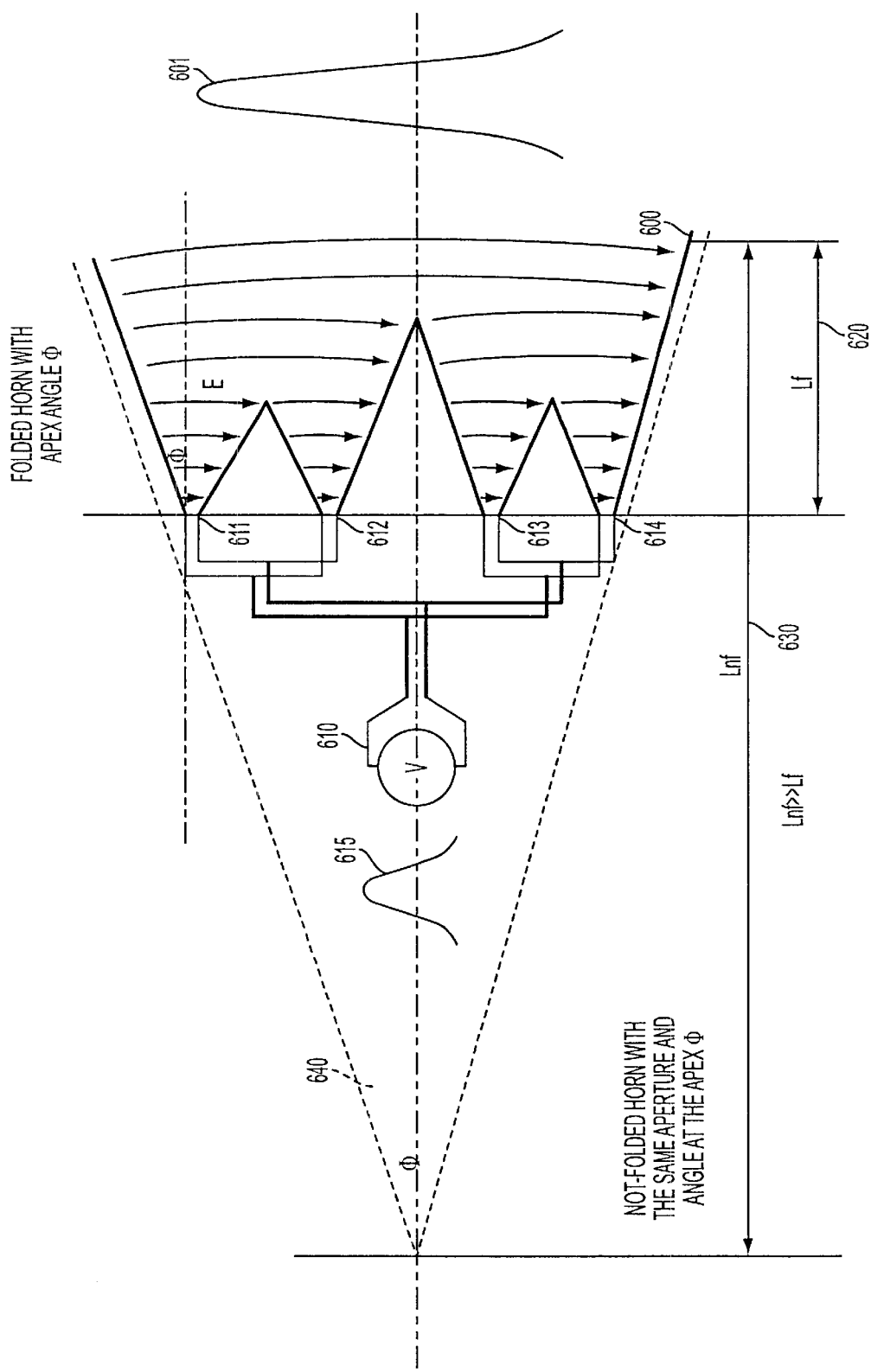
FIG. 6 is a diagram of an exemplary antenna for transmitting electromagnetic signals in accordance with another exemplary embodiment of the present invention.

For transmitting pulse 413 in accordance with various embodiments of the present invention, several alternative transmit antenna structures may be considered. One exemplary antenna with preferable characteristics however, is folded long horn antenna 500 as illustrated in FIG. 5. Therein, separate synchronized pulse input signals 511, 521, 531, and 541 may be applied respectively at voltage sources 510, 520, 530, and 540 to the base sections of respective horn sections 512, 522, 532, and 542. Respective component pulses 513, 523, 533, and 543 may propagate along individual horn sections and converge at sections 514 and 534. Pulses 513 and 523 may converge in section 514 to form additive pulse 502, and pulses 533 and 543 may likewise converge in section 534 to form additive pulse 503. Additive pulses 502 and 503 may converge in section 515 to form output pulse 501 with an even greater amplitude representing the sum of pulses 502 and 503. As will be appreciated, while FIG. 5 shows four pulses being generated and combined, a greater or fewer number of pulses may be generated and combined in a similar manner.

An alternative to folded long horn antenna 500 is a shorter folded horn antenna 600. As can be seen, while physical length $L_f$ 620 of folded horn antenna 600 is less than physical length $L_{nf}$ 630 of folded long horn antenna 500, apex angle 640 is set for the same aperture as that of folded long horn antenna 500. Thus in a similar manner, but using a smaller packaging, folded horn antenna 600 may generate a suitable pulse 601 for generating precursors by applying a smaller pulse 615 at voltage source 610 to the respective bases 611–614 of folded horn antenna 600. Resulting individual pulses may converge in the common horn section and sum to form pulse 601.

As previously described, generating pulses such as, for example, pulse 615, or pulses 511, 521, 531, or 541 may be generated in one of several ways. While spark gap devices may be used, as described, the life cycle of a spark gap device is limited due to the destructive action of the spark generated by the device on its anode and cathode. Thus, a preferred manner of generating such pulses is by the operation of ultra fast microwave switches. Some fast semiconductor switches may be operated in the order of a few nanoseconds at, for example, 1jV and hundreds of amperes switching current. However, if higher voltages are desired the corresponding need to increase the size of the semiconductor material leads to higher turn-on times. New approaches to microwave switches are described in a paper entitled "New Superfast Power Closing Switched-Dynistors on Delayed Ionization", V. M. Efanov, and A. F. Kardo-Sysoev, et al, Ioffe Physical-Technical Institute of Russian Academy of Science, St.Petersburg, Russia, and may be suitable for use in accordance with the present invention. Therein a Fast Ionization Dynistor is described, which behaves like a thyristor, e.g. it has two steady states non-conducting and high-conducting. Transition from one state to another can occur at less than 1 nanosecond and may be induced by delayed ionization by the application of a short, high voltage pulse to the blocking p-n junction of a many-layered n+pnp+ structure. Regenerative feedback may keep the device turned on indefinitely necessitating the intervention by an external circuit to switch off the device.

Figure 7A:
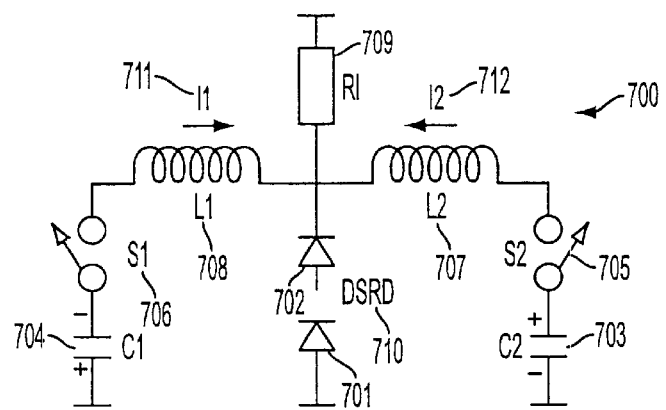
FIG. 7A is a schematic diagram illustrating an exemplary circuit for generating a pulse in accordance with an exemplary embodiment of the present invention.

Other related devices are described in a paper entitled "Power Nanosecond Semiconductor Opening Plasma Switches", V. I. Brylevsky, V. M. Efanov, et al, Ioffe Physical-Technical Institute of Russian Academy of Science, St. Petersburg, Russia. Therein, devices known as Drift Step Recovery Diodes (DSRD) are described for switching in fast applications. An exemplary circuit employing DSRD 710, shown, for example having two separate junctions 701 and 702 is illustrated in FIG. 7A. It should be noted that DSRD 710 may comprise relatively thick p+ and n+ layers of around 90 microns made, for example, by deep diffusion processes.

Figure 7B:
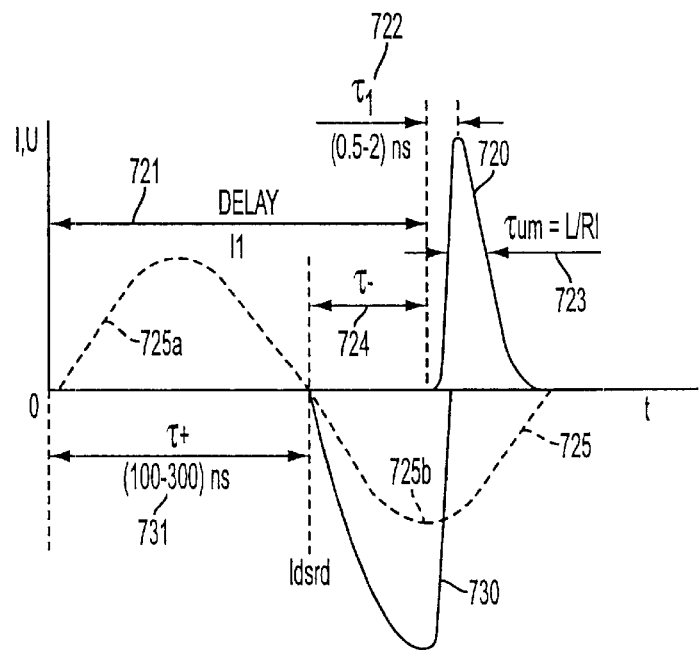
FIG. 7B is a graph illustrating an exemplary pulse signal generated in accordance with an exemplary embodiment of the present invention as shown in FIG. 7A.

Symmetrical circuit 700 may operate as follows. Capacitors C1 704 and C2 703 may be initially charged and switches S1 706 and S2 705 are initially open. It should be noted that capacitors C1 704 and C2 703 may be charged to opposite polarities. Switch S1 706 may be closed discharging capacitor C1 704 through inductor L1 708 and DSRD 710. Discharge current I1 711 is a forward current for DSRD 710 and thus resistance in DSRD 710 is low causing current I1 711 to oscillate. During oscillation, when current I1 711 changes direction as can be seen in FIG. 7B during second half cycle 725b of current curve 725 for I1 711, DSRD 710 remains in a high conducting state due to the large numbers of stored minority carriers. If, switch S2 705 is closed, for example, at t+ 731, corresponding to the zero crossover point, discharge current I2 712 from C2 703 is added to current I1 711 effectively doubling the current through DSRD 710, shown in FIG. 7B as current curve 730. When the current is at a maximum, for example, at t– 724, charge injected into DSRD 710 and charge extracted are equal and DSRD 710 begins to shut off sharply. At that instant, energy stored in capacitors C1 704 and C2 703 is accumulated in inductors L1 708 and L2 707 and inductor currents reach maximum values. As DSRD 710 switches off, its current is switched to, for example, load resistance R1 709. Thus, the sharpness of the leading edge of current pulse 720 delivered to load resistance R1 709 is determined by turn off time tf 722 of DSRD 710. The decay of pulse 720 may further be determined by L/R, where L is the total parallel inductance of L1 711 and L2 712 and where $R_l$ is the resistance of R1 709. It should further be noted that the voltage associated with output pulse 720, expressed as $R_l/(I_1+I_2)$, may be greater than an order of magnitude greater than initial capacitor voltage. However, the high voltage is only present in the circuit for a short time thereby minimizing the disadvantages of generating finite DC voltage at such high levels which disadvantages include, for example, corona and arc discharge.

Figure 8A:
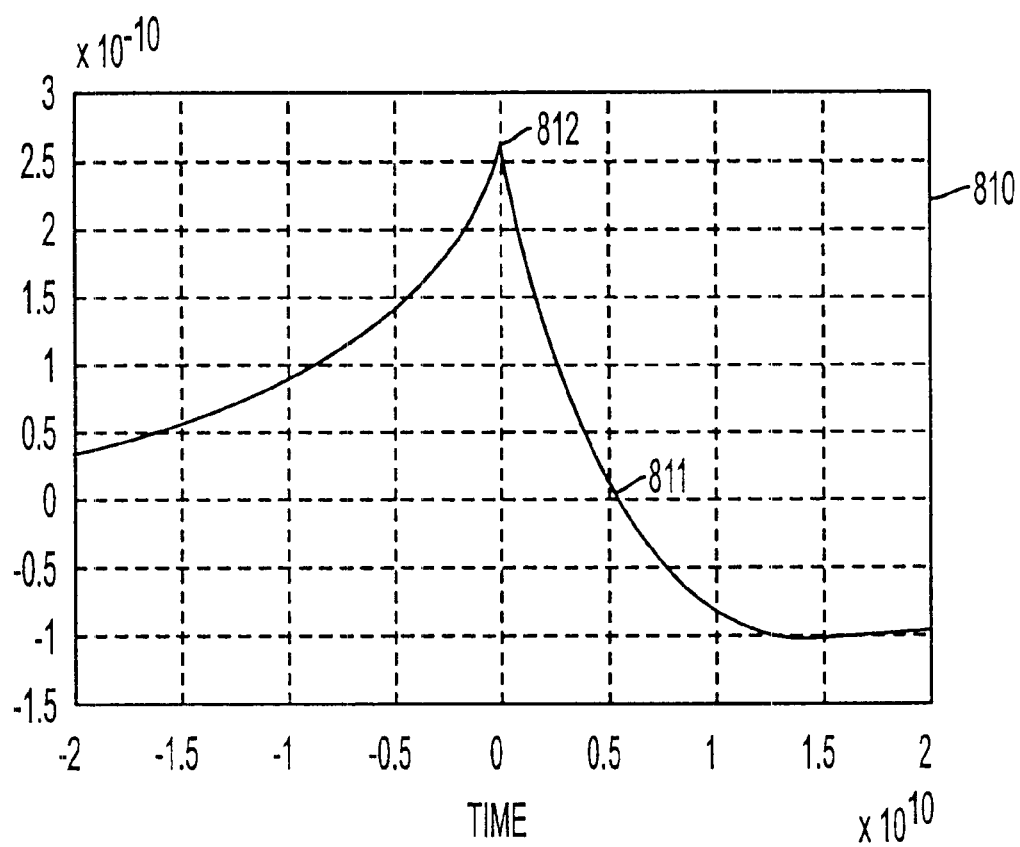
FIG. 8A is a graph illustrating an exemplary matched filter response to a precursor signal for a receiver in accordance with an exemplary embodiment of the present invention.
Figure 8B:
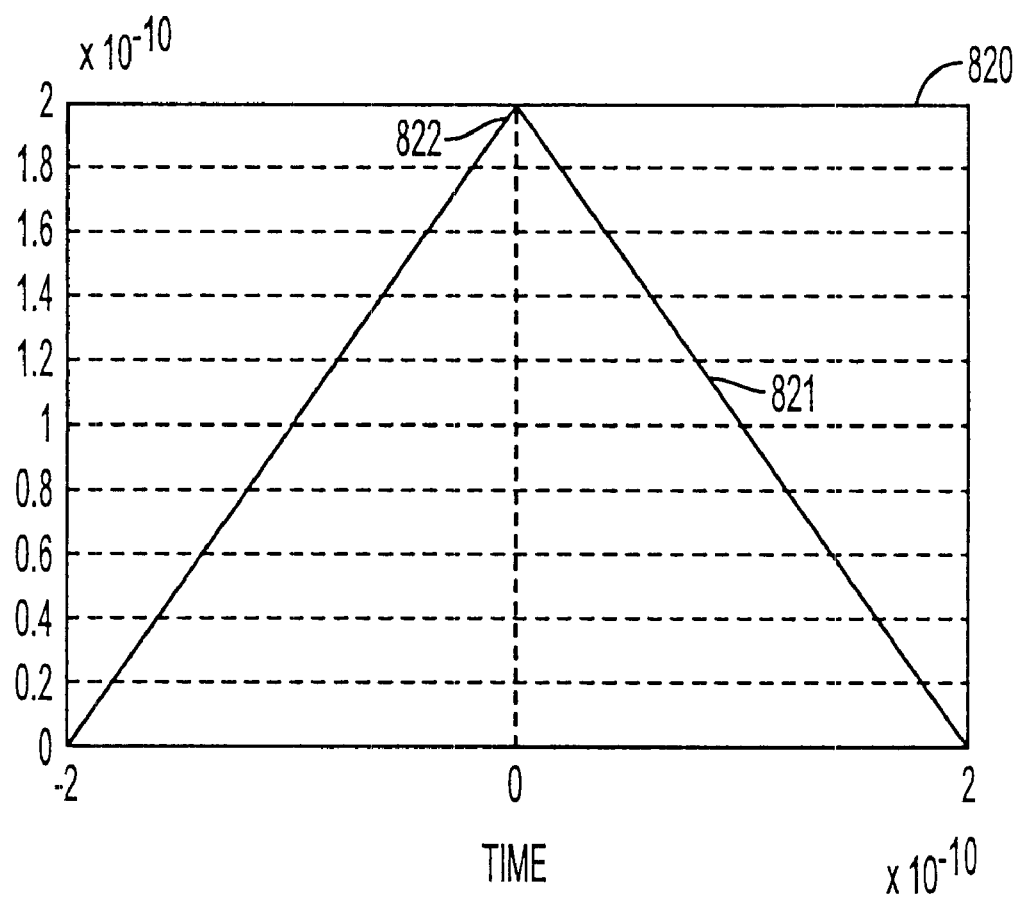
FIG. 8B is a graph illustrating an exemplary matched filter response to a CW signal for a receiver in accordance with an exemplary embodiment of the present invention.
Figure 8C:
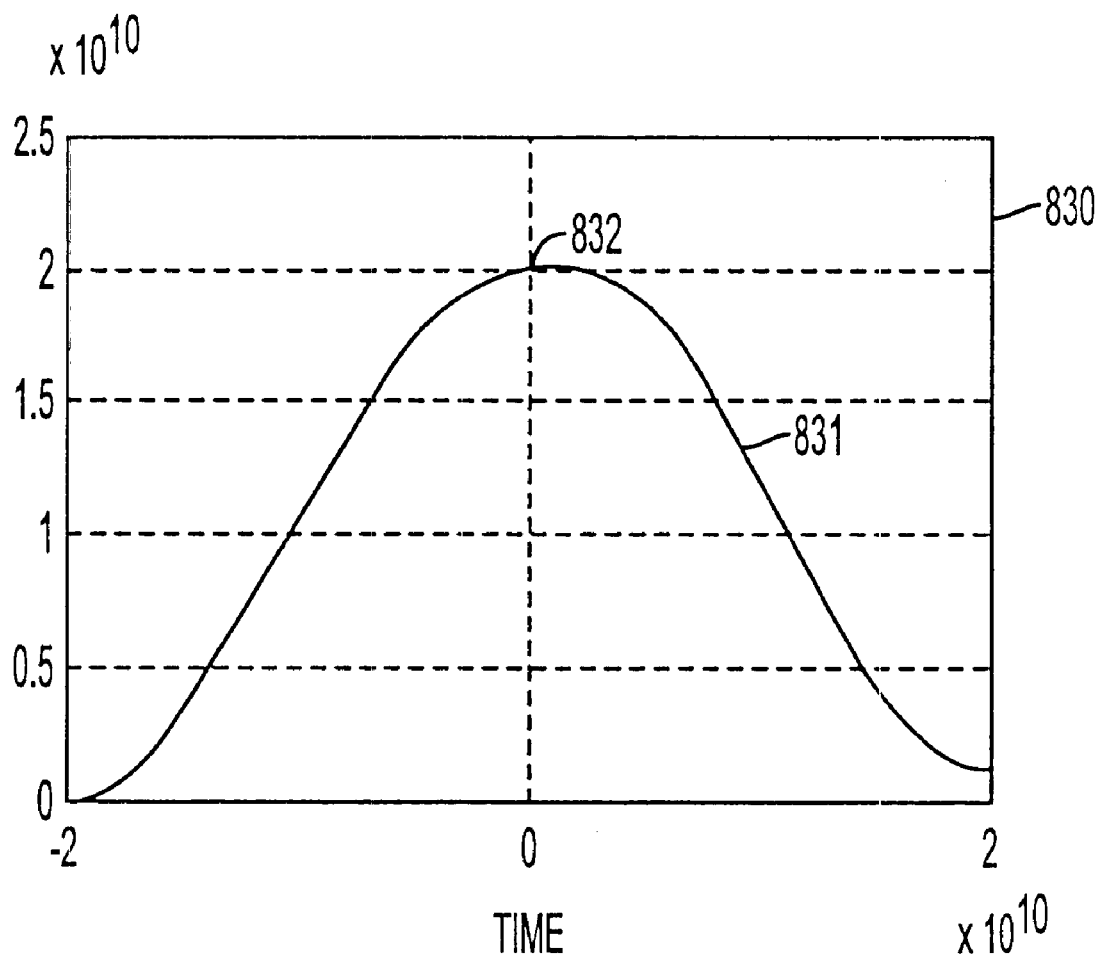
FIG. 8C is a graph illustrating an exemplary matched filter response to a square wave signal for a receiver in accordance with an exemplary embodiment of the present invention.

Thus while the description above relates to generating pulses suitable for exciting precursors in accordance with the present invention, a suitable receiver design for receiver section 400b may be useful. FIG. 8A, FIG. 8B, and FIG. 8C illustrate several exemplary receiver characteristics which may be useful in configuring, for example, a receiver transfer characteristic that is capable of receiving precursor signals. FIG. 8A shows a time domain transfer characteristic 810 including exemplary theoretical matched filter response curve 811 for an exemplary receiver configured to receive precursors. It can be seen that in accordance with various exemplary embodiments of the present invention, matching filter characteristics allows for maximum pass characteristics, e.g. allows for the passage of the maximum amount of energy from the desired waveform while suppressing the maximum amount of noise. Returns are possible with poorly matched filters, however, SNR in a poorly matched or unmatched filter scenario will be sub-optimal. It can be seen that in accordance with the present invention, maximum pass characteristics are achieved at time zero corresponding to precursor spectra at $f_r$ 812. By comparison, FIG. 8B shows transfer characteristic 820 including an non-theoretical matched filter response curve 821 for an exemplary receiver configured to receive a conventional square wave pulses with a frequency centered at $f_r$ 822. Similarly, FIG. 8C shows transfer characteristic 800 including matched filter response curve 831 for an exemplary receiver configured to receive square wave signals centered at $f_r$ 832.

Figure 9A:
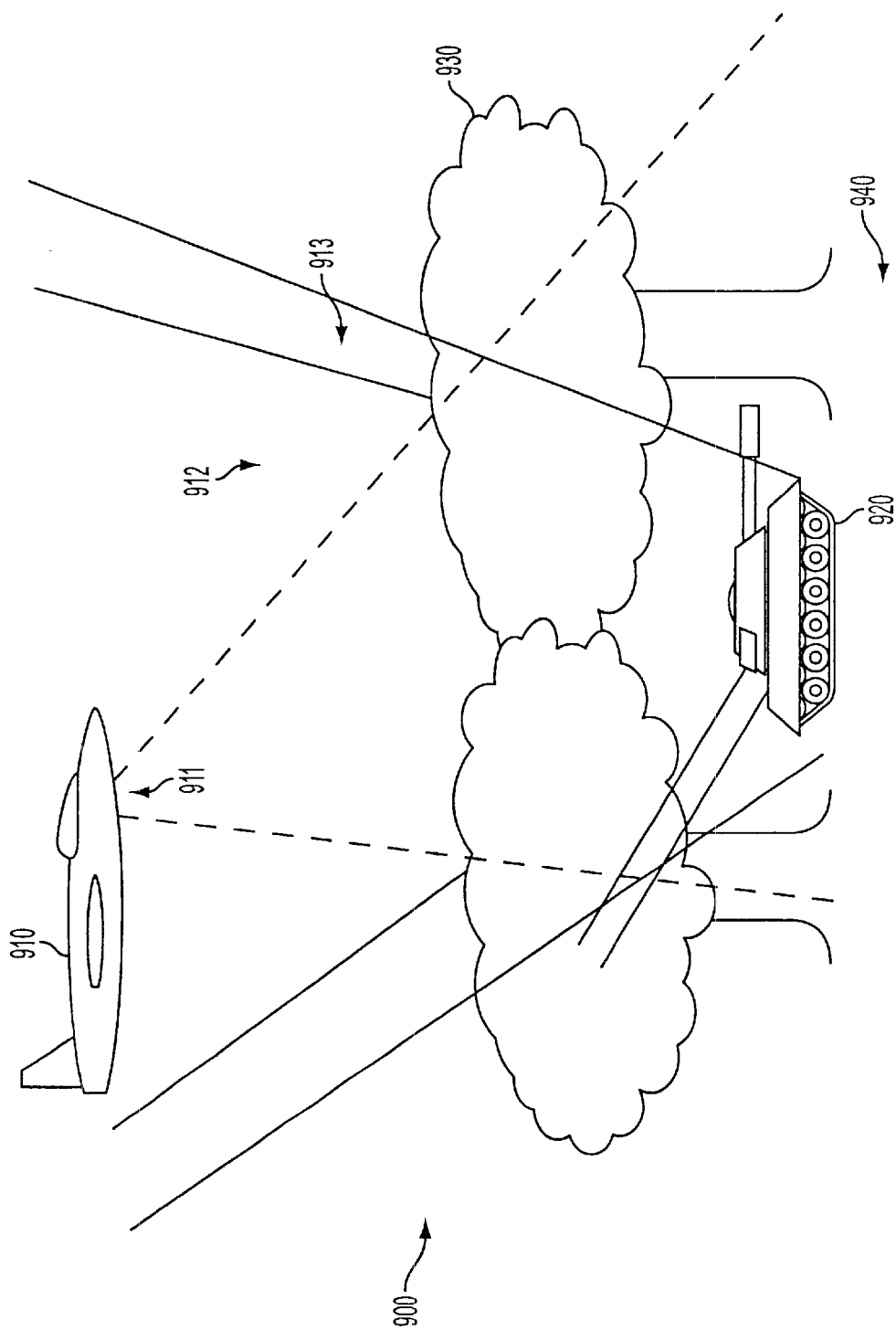
FIG. 9A is a diagram illustrating an exemplary scenario for object identification in accordance with an exemplary embodiment of the present invention.

As previously described a precursor based radar system allowing for object identification in accordance with exemplary embodiments of the present invention may be useful for military applications. FIG. 9A illustrates exemplary military operational scenario 900 wherein airborne radar platform 910 may provide, for example, the capability to transmit signals 911 capable of generating precursors. As illustrated, signals 911 are transmitted into a target environment containing radar absorptive material such as, for example, foliage 930. Scatter 913 may be generated from foliage 930, however, precursors may be generated which penetrate foliage 930 and coim into contact with, for example, object 920 which may be a tank or other military assest using foliage 930 as cover. Precursor 913 return may be detected in the receiver section of airborne radar platform 910 and processed accordingly.

Figures 9B, 9C:
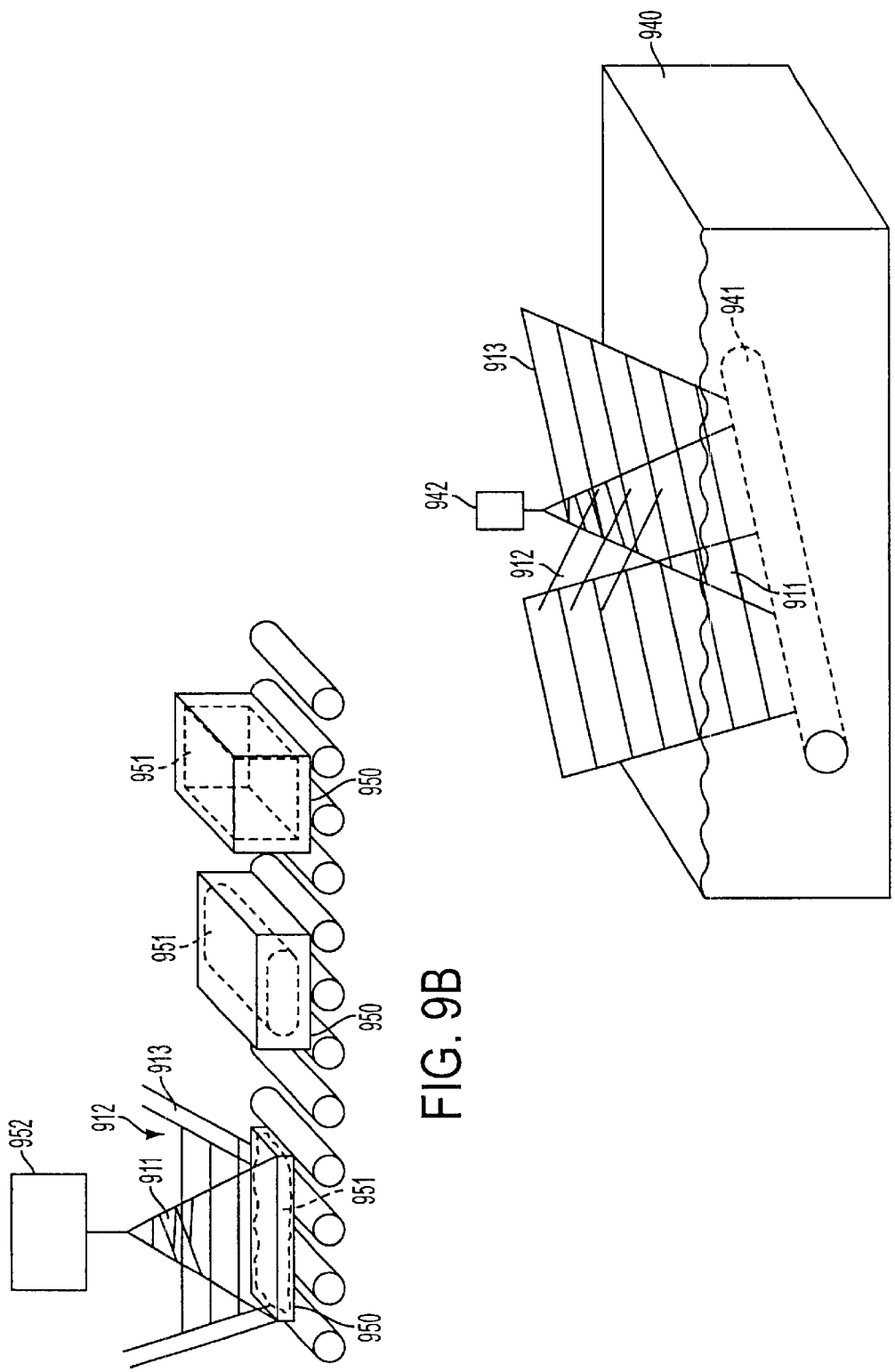
FIG. 9B is a diagram illustrating an exemplary scenario for object identification in accordance with another exemplary embodiment of the present invention.
FIG. 9C is a diagram illustrating an exemplary scenario for object identification in accordance with yet another exemplary embodiment of the present invention.

Additional civilian applications may exist in accordance with the present invention as illustrated in FIG. 9B and FIG. 9C. For example, a short-range system having transmitter/receiver 952, could be used to examine the contents of packages 950, and indicate the general type of material 951 they contain by irradiating packages 950 with signal 911 capable, as described with reference to FIG. 9A, of generating precursors. Customs officials could use this to identify a variety of contraband, including drugs, illegal plant or foodstuffs, and the like.

As precursors have the ability to penetrate moist soil 940, precursor radar 942 could provide detailed images of subterranean objects 941. This would be useful for locating pipes & wires, buried structures, and objects of archeological interest.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for signal processing to identify an object in an environment, the method comprising the steps of:

receiving a precursor associated with a first electromagnetic wave interacting with the object; and identifying a property of the object using one or more characteristics associated with the received precursor.

2. The method of claim 1, further comprising the step of transmitting the first electromagnetic wave with a characteristic so as to generate the precursor when the first electromagnetic wave interacts with the object.

3. The method of claim 2, wherein the characteristic of the first electromagnetic wave includes a pulse having a sharp rise time, and wherein the step of transmitting further comprises the steps of:

generating the pulse using a circuit including capacitive discharge; and generating the sharp rise time using the circuit including a semiconductor device.

4. The method of claim 3, wherein the semiconductor device includes a Drift Step Recovery Diode.

5. The method of claim 2, wherein the characteristic of the first electromagnetic wave includes a pulse having a sharp rise time, and wherein the step of transmitting further comprises the steps of:

generating the first electromagnetic wave using a microwave diode switch; and amplifying the first electromagnetic wave through a broadband semiconductor amplifier.

6. The method of claim 2, wherein the characteristic of the first electromagnetic wave includes a pulse having a sharp rise time, and wherein the step of transmitting further comprises the steps of:

generating the first electromagnetic wave using a microwave diode switch; and amplifying the first electromagnetic wave through a traveling wave tube amplifier.

7. The method of claim 2, wherein the characteristic of the first electromagnetic wave includes at least one phase reversal, and wherein the step of transmitting further comprises the step of phase modulating the first electromagnetic wave to generate the at least one phase reversal so as to generate the precursor when the phase modulated first electromagnetic wave interacts with the object.

8. The method of claim 1, wherein the step of receiving further comprises the steps of:

establishing one or more channels corresponding to the one or more possible characteristics associated with the precursor; and associating each of the one-or-more channels with a corresponding one of one or more possible material properties associated with the object.

9. The method of claim 8, wherein the each of one or more possible characteristics includes a corresponding precursor spectra associated with the corresponding one or the one or more possible material properties and wherein the corresponding precursor spectra include one of: water generated precursor spectra, radar absorptive material generated precursor spectra, and metallic oxides generated precursor spectra.

10. The method of claim 9, further comprising the steps of:

presenting a color display including an image of the object; and indicating which of the one or more possible material properties are associated with the object by displaying each of the one or more material properties with a corresponding color in proportion to one or more respective values associated with one or more received precursor spectra.

11. An apparatus for signal processing to identify an object in an environment, the apparatus comprising:

a receive antenna; and a receiver coupled to the antenna, the receiver configured to:

receive a precursor associated with a first electromagnetic wave interacting with the object; and identify a property of the object using one or more characteristics associated with the received precursor.

12. The apparatus of claim 11, further comprising:

a transmit antenna; and a transmitter coupled to the transmit antenna, the transmitter configured to:

transmit the first electromagnetic wave with a characteristic so as to generate the precursor when the first electromagnetic wave interacts with the object.

13. The apparatus of claim 12, wherein the characteristic of the first electromagnetic wave includes a pulse having a sharp rise time, and wherein the transmitter is further configured to:

generate the pulse using a circuit including capacitive discharge; and generate the sharp rise time using the circuit including a semiconductor device.

14. The apparatus of claim 13, wherein the semiconductor device includes a Drift Step Recovery Diode.

15. The apparatus of claim 12, wherein the characteristic of the first electromagnetic wave includes a pulse having a sharp rise time, and wherein the transmitter is further configured to:

generate the first electromagnetic wave using a microwave diode switch; and amplify the first electromagnetic wave through a broadband semiconductor amplifier.

16. The apparatus of claim 12, wherein the characteristic of the first electromagnetic wave includes a pulse having a sharp rise time, and wherein the transmitter is further configured to:

generate the first electromagnetic wave using a microwave diode switch; and amplify the first electromagnetic wave through a traveling wave tube amplifier.

17. The apparatus of claim 12, wherein the characteristic of the first electromagnetic wave includes at least one phase reversal, and wherein the transmitter is further configured to phase modulate the first electromagnetic wave to generate the at least one phase reversal so as to generate the precursor when the first electromagnetic wave interacts with the object.

18. The apparatus of claim 11, wherein the receiver is further configured to:

establish one or more channels corresponding to the one or more possible characteristics associated with the precursor; and associate each of the one or more channels with a corresponding one of one or more possible material properties associated with the object.

19. The apparatus of claim 18, wherein the each of one or more possible characteristics includes a corresponding precursor spectra associated with the corresponding one or the one or more possible material properties and wherein the corresponding precursor spectra include one of: water generated precursor spectra, radar absorptive material generated precursor spectra, and metallic oxides generated precursor spectra.

20. The apparatus of claim 19, further comprising:

a display coupled to the receiver, the receiver further configured to:

present a color display including an image of the object on the display; and indicate which of the one or more possible material properties are associated with the object by displaying each of the one or more material properties with a corresponding color in proportion to one or more respective values associated with one or more received precursor spectra.

\* \* \* \* \*